March 22, 1966  W. C. HARMON  3,242,425
FLAW DETECTOR FOR WIRE ROPE USING AN INSPECTION COIL ENERGIZED
BY AN OSCILLATOR HAVING TIME DELAY FEEDBACK MEANS
Filed Feb. 24, 1961  6 Sheets-Sheet 2

INVENTOR.
WILLIAM C. HARMON
BY Robert P. Wright
ATTORNEY

March 22, 1966 W. C. HARMON 3,242,425
FLAW DETECTOR FOR WIRE ROPE USING AN INSPECTION COIL ENERGIZED
BY AN OSCILLATOR HAVING TIME DELAY FEEDBACK MEANS
Filed Feb. 24, 1961 6 Sheets-Sheet 3

Fig. 3.

INVENTOR.
WILLIAM C. HARMON
BY Robert P. Wright
ATTORNEY

United States Patent Office
3,242,425
Patented Mar. 22, 1966

1

3,242,425
FLAW DETECTOR FOR WIRE ROPE USING AN INSPECTION COIL ENERGIZED BY AN OSCILLATOR HAVING TIME DELAY FEEDBACK MEANS
William C. Harmon, 419 E. Washington St., Chagrin Falls, Ohio
Filed Feb. 24, 1961, Ser. No. 91,507
8 Claims. (Cl. 324—37)

This invention relates to a system for inspecting wire rope. More particularly, the invention relates to an electronic wire rope inspecting system which is adapted for use on a moving wire rope, including wire ropes which are in active service.

Industrial, as well as domestic, applications of wire rope are many and varied. In most of these applications, unexpected failure of the rope can result in serious property damage, and in loss of life.

It is obvious, therefore, that a rapid means of reliably inspecting wire ropes employed in these critical applications would be most desirable. The results of such inspections could then be used as a basis for the immediate removal from service of a rope in which harmful flaws have been detected. By the same token, the information so gained could also be the basis for retaining in service for maximum length of time rope still in serviceable condition.

In spite of this need, visual examination has been the only practical non-destructive method used for checking the soundness of wire rope. Visual examination, at best, however, cannot detect internal flaws such as internal corrosion or parted cores. Moreover, visual examination is time consuming and sometimes requires the removal of the rope from service during the inspection period.

This invention, therefore, relates to an electronic wire inspection system adapted to provide a positive indication of a rope's condition. Previous attempts at the electronic testing of wire rope have met with little success because of the many variables involved; particularly that of variations in rope dimensions and cold working which may change appreciably over the length of the rope. The invention herein has overcome these difficulties and has proven itself to give a reliable indication of many types of defects, both internal and external, that are common to wire ropes.

The system resorts to the use of a split coil inspection unit whereby rope inspection can take place without dismantling the rope from its load and without interfering with the normal use of the rope.

The inspection process, according to the invention, is a rapid one since the system is capable of testing rope passing through the inspection unit at a rate up to 35 miles of rope per hour.

It is a further object of the invention to provide a wire rope inspecting system which will provide a graphic record of the condition of the rope which may be compared with a subsequent graphic record of the same rope to disclose progressive degradation.

The system is adapted to rope in a wide variety of sizes and in all common constructions. The circuitry employed is highly stable and employs self-compensating networks to insure reliable indication of rope condition under all conditions of measurement.

2

The basic rope inspection system herein includes an annular inspection coil which encircles a moving rope which effectively acts as a core. Defects in the rope produce changes in the conductivity and permeability of the core, and these changes, in turn, are reflected as changes in the electrical impedance of the coil.

Further novel features and advantages of the invention will be more fully developed hereinbelow and others will become apparent from a reading of the description of the invention in light of the drawings forming a part of this application. In these drawings like reference numerals indicate like parts, and.

Figure 1:
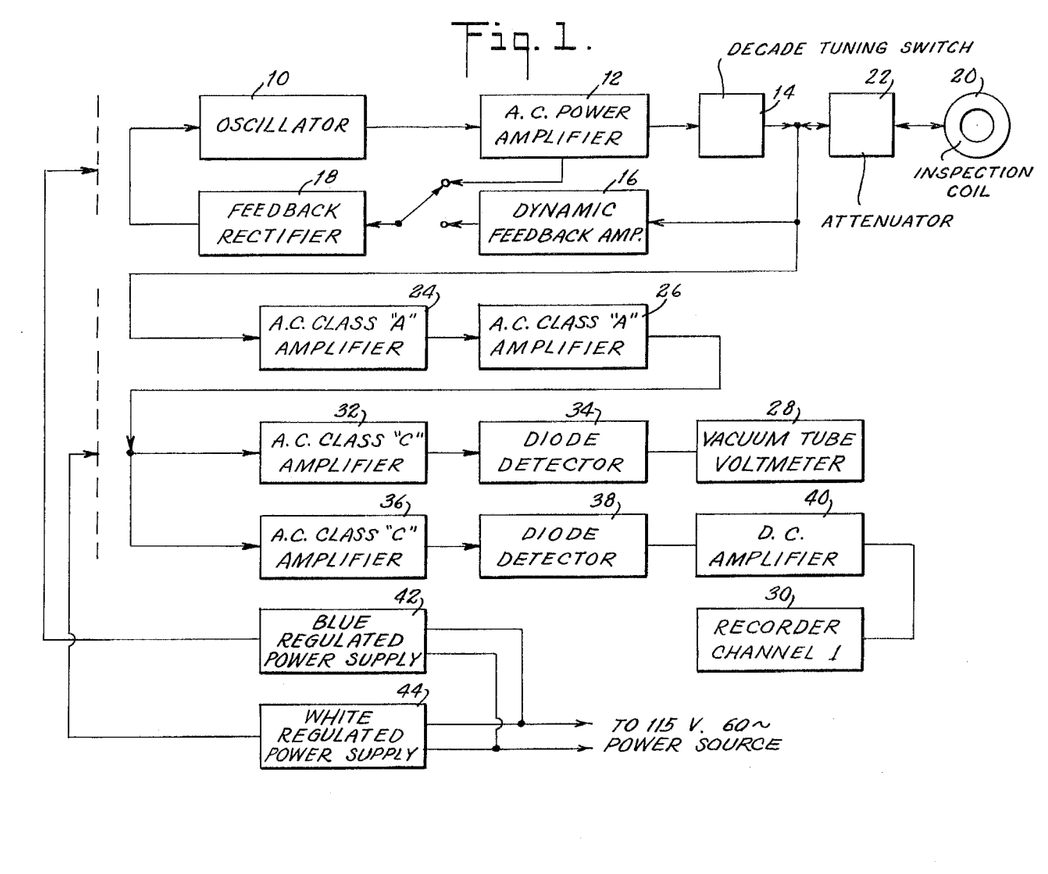
FIG. 1 is a block diagram of the electronic rope inspector comprising the invention herein.

As seen in the block diagram of FIG. 1, the detector unit consists of an electronic circuit including an oscillator 10, an A.C. power amplifier 12, a decade tuning switch 14, a dynamic feed back amplifier 16, and a feed back rectifier 18. The inspection coil 20 is connected into the circuit through an attenuator 22. The attenuator 22 and the decade tuning switch 14 comprise output circuit means coupling the A.C. power amplifier 12 to the coil 20, while together the A.C. power amplifier 12, the decade tuning switch 14 and the attenuator 22 comprise coupling means for applying output signals from the oscillator 10 to the inductor coil 20 to energize that coil. The output voltage at the junction of the decade tuning switch 14 and the attenuator 22 is passed through two A.C. class A amplifiers 24 and 26. The amplified output is fed through parallel circuits to a vacuum tube voltmeter 28 and a recorder 30. The vacuum tube voltmeter is fed by way of an A.C. class C amplifier 32 and a diode detector 34. The recorder is fed by way of an A.C. class C amplifier 36, a diode detector 38 and a D.C. amplifier 40. The circuit is powered by two identical power supply units 42 and 44 (one of which is shown in the wiring diagram of FIG. 7). These are connected to a source of 115-volt 60-cycle current.

Figure 5:
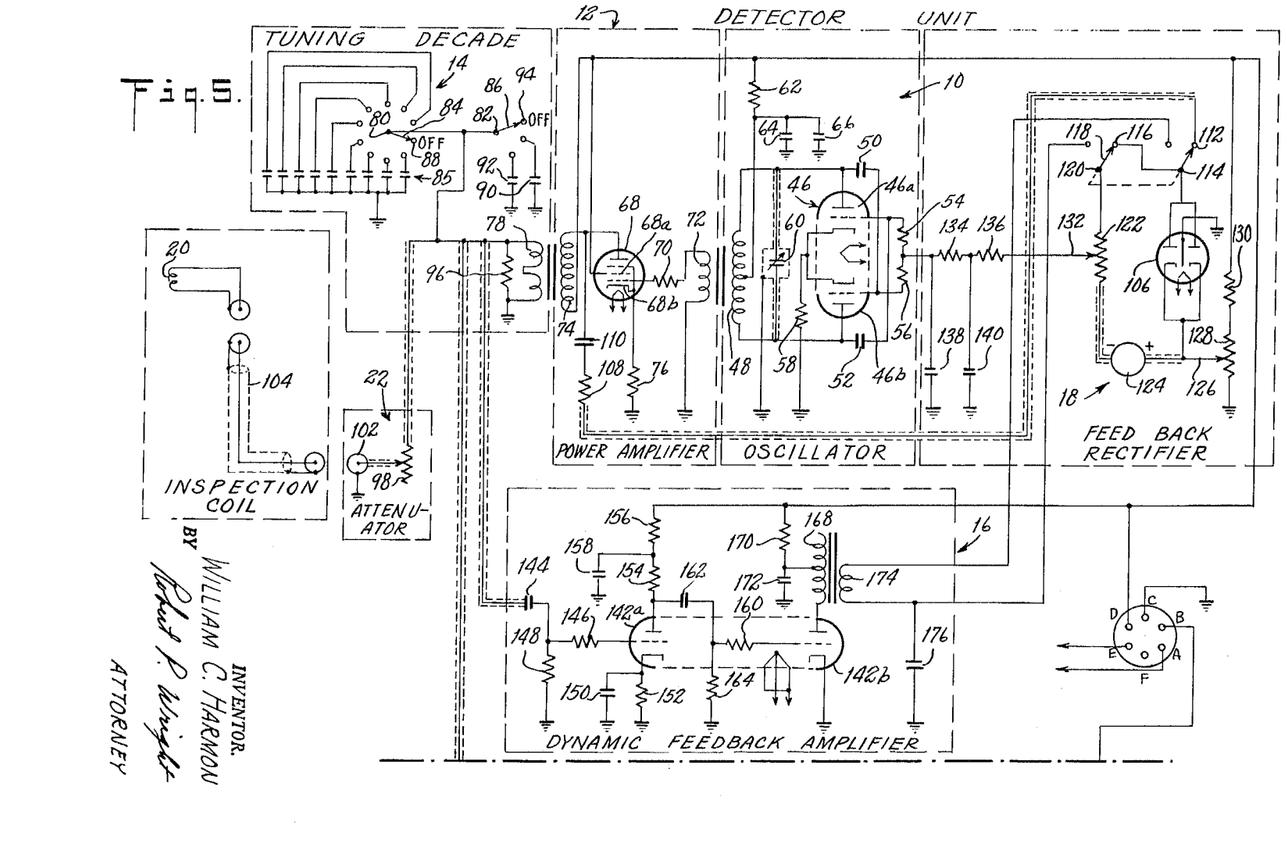
FIGS. 5, 6 and 7, taken together as indicated in FIG. 4, comprise the wiring diagram of the electronic detector unit.
Figure 6:
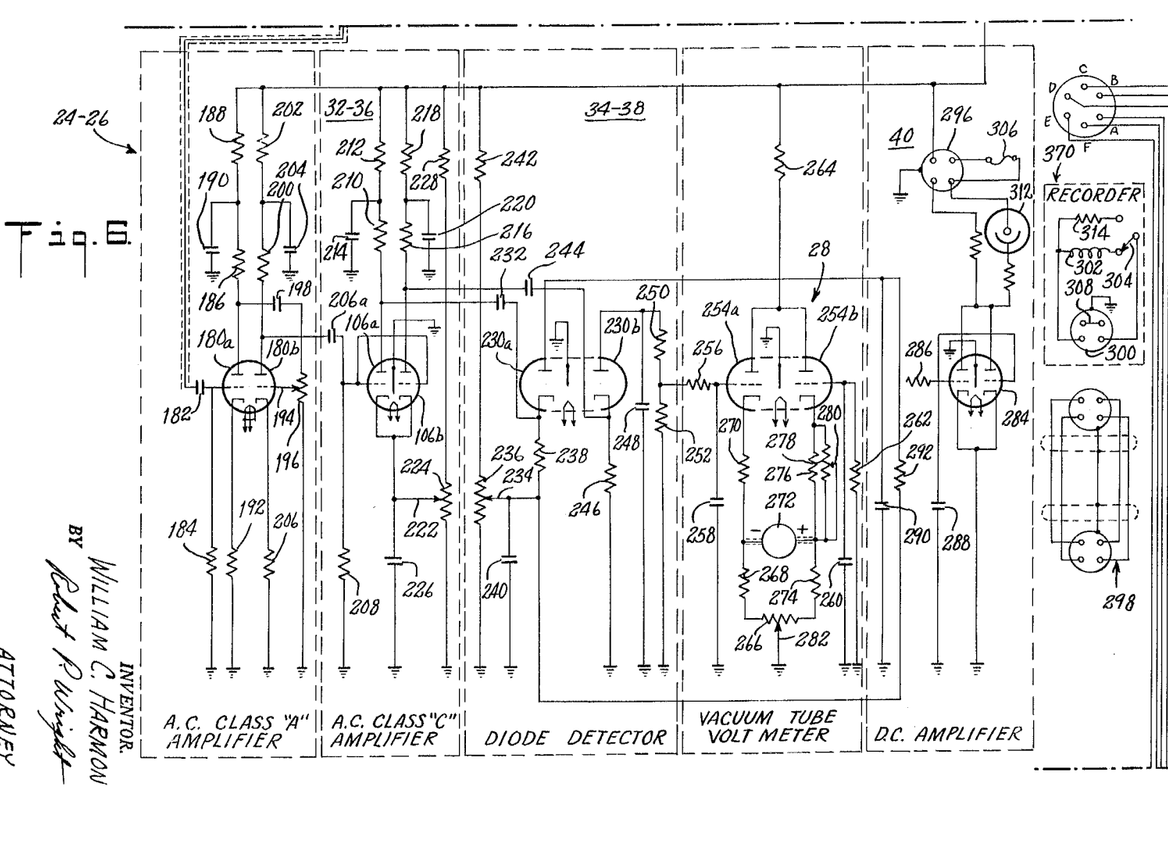
Figure 7:
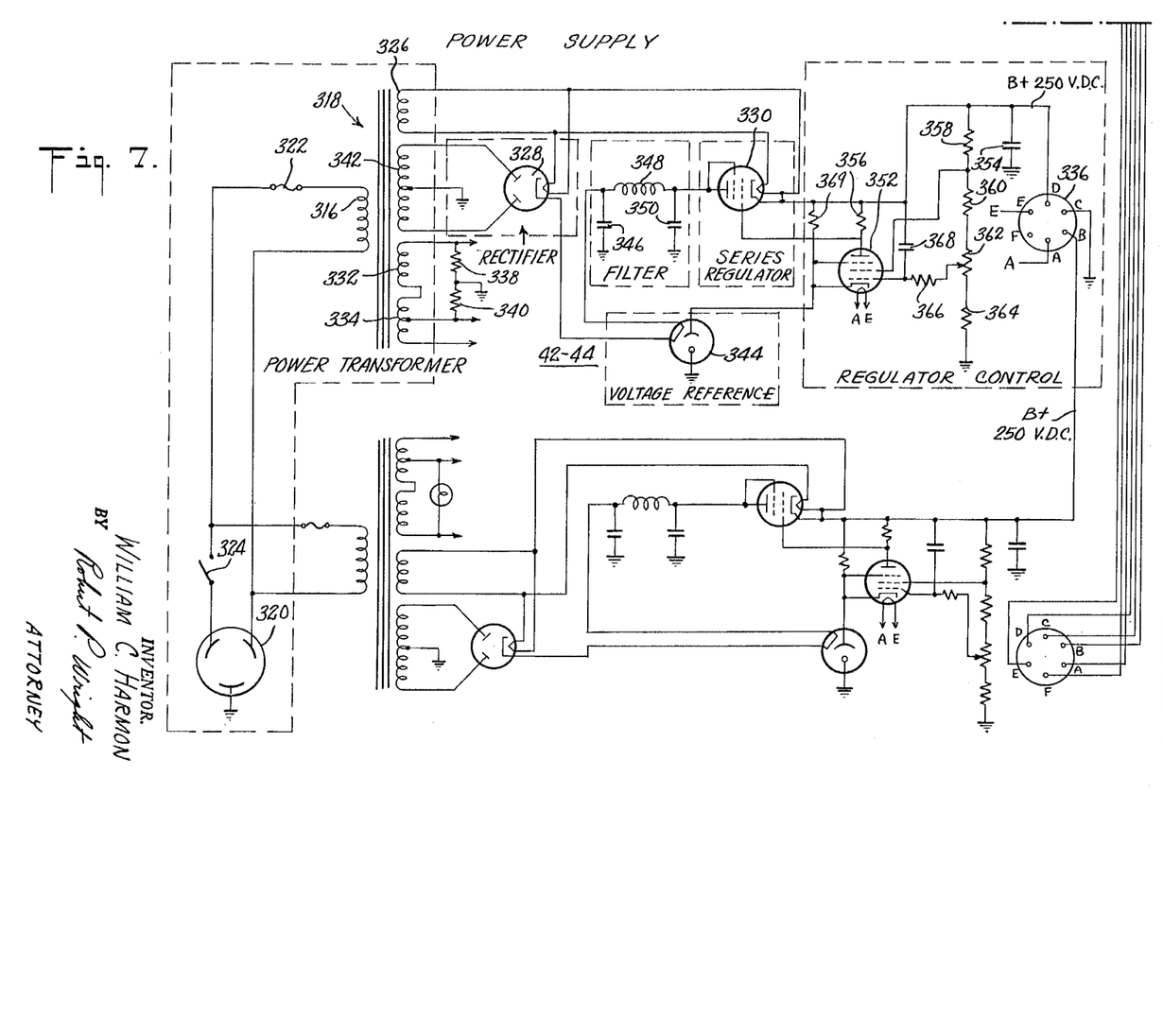

The details of the circuit are shown in FIGS. 5 through 7. The inspection coil 20, which will be described in greater detail at a later point herein, consists of fifty turns of No. 18 copper wire on a hollow, non-metallic cylindrical form, about 5 inches long and of sufficient inner diameter to permit free passage of the rope under test. The coil is preferably split longitudinally to facilitate mounting about the rope being tested. The coil encircles the rope which effectively acts as a core. Defects in the rope represent changes in the conductivity and magnetic permeability of the core. These changes, in turn, are reflected as changes in the electrical impedance of the coil.

The coil is connected, as stated, into the detector unit. In the detector unit (FIG. 5), the two sections 46a and 46b of the 6CG7 dual triode tube 46 are utilized as a push-pull oscillator. The plate of section 46a is connected to one end of the primary winding of an oscillating transformer 48 and through a 0.01 mfd. capacitor 50 to the grid of section 46b. The plate of section 46b is connected to the opposite end of the primary winding 48 and through a 0.01 mfd. capacitor 52 to the grid of section 46a. The grids of sections 46a and 46b are connected to each other through series connected 470K resistors 54 and 56. The cathodes of sections 46a and 46b are tied together and are grounded through a 30K resistor 58. A 15 to 140 mmfd. variable capacitor 60 is paralleled across the transformer winding 48. The center tap of the transformer winding 48 is connected to B+ through a 100K resistor 62, and is bypassed to ground by parallel capacitors 64 and 66 of 1 mfd. and 16 mfd. capacity respectively.

The oscillator is a push-pull cross-coupled type wherein positive feed back is obtained by supplying a portion of the output of one section to the input of the opposite section. This cross-coupling is accomplished through capacitors 50 and 52. The primary winding of the oscillator transformer 48 and the variable capacitor 60 form a tuned circuit which determines the frequency of oscillation. In use, the capacitor 60 is adjusted so that the oscillator operates at approximately 6500 c.p.s. The power amplifier 12 employs a 6AQ5 power-beam pentode tube 68. The control grid of the tube 68 is connected through 1K resistor 70 to one end of the secondary winding 72 of the oscillator transformer. The opposite end of the winding 72 is grounded. The plate of the tube 68 is connected to one end of a primary winding 74 of an output transformer. The opposite end of the winding 74 is connected to the B+ supply. The screen grid 68a of the tube 68 is also connected to the B+ supply. The cathode 68b of the tube 68 is grounded through a 330-ohm resistor 76.

The tube 68 functions as a conventional class A power amplifier and it receives its drive from the secondary winding 72 of the oscillator transformer. The tube supplies the 6500 c.p.s. oscillations to the output transformer at a power level suitable for inspection coil excitation.

The decade tuning switch 14 (FIG. 5) is connected to one end of the secondary winding 78 of the output transformer. This connection is made at the rotor terminals 80 and 82 of switches 84 and 86. The switch 84 has ten positions and allows the connection of a selected one of nine capacitors 85 between its rotor and ground. The capacitors in the switch circuit are selected to have a value respectively of 0.1, 0.2, 0.3, 0.4, 0.5, 0.6, 0.7, 0.8 and 0.9 mfd. The switch 84 also has an off position 88. The switch 86 has three positions and allows the connection of either a 1 mfd. capacitor 90 or a 2 mfd. capacitor 92 between its rotor 82 and ground. The switch 86 also has an off position 94. The opposite end of the secondary winding of the output transformer 78 is grounded. The winding 78 is shunted by a 33K resistor 96.

The tuning of the decade switch 14 allows the inspection coil 20 to be resonated at the oscillator frequency and within a range above and below the oscillator frequency. Because of the described circuit arrangement, between 0 and 2.90 mfd. (at 0.1 mfd. increments) may be selected. In operation, a capacitance value is chosen which tunes the coil 20 slightly off resonance. This procedure increases sensitivity and allows the inspection system to provide different output indications for various types of rope defects.

In the attenuator 22 (FIG. 5), one end of a 50-ohm potentiometer 98 is connected to the ungrounded end of the secondary winding 78 of the output transformer. The slider 100 of the potentiometer is connected to a cable connector 102.

The attenuator introduces a variable resistance in series with the inspection coil 20. The addition of resistance to the coil circuit effectively lowers the Q of this circuit and thereby reduces instrument sensitivity. Adjustment of the potentiometer slider 100 permits use of sensitivity commensurate with test requirements.

The inspection coil 20 (FIG. 5) is connected to the detector unit through a length of coaxial cable 104. In operation, the 6500 c.p.s. voltage developed by the oscillator is fed to the inspection coil 20 by way of the power amplifier 12 (FIG. 5), the output transformer, the decade tuning switch 14 and the attenuator 22. The inspection coil 20 being tuned nearly to resonance has a relatively large signal voltage developed across it. As previously stated, the defects in the rope under test are reflected as changes in the impedance of the coil. As the coil impedance changes, the voltage developed across it changes also. Normally, rope defects act to vary the tuning of the coil, thereby changing the coil voltage for the duration of the time the defect is sensed by the inspection coil. These amplitude variations are amplified for use in the indicating and recording elements of the system.

The feed back rectifier 18 (FIG. 5) utilizes paralleled sections of a 6AL5 dual diode tube 106. The series combination of a 100K resistor 108 and a 0.02 mfd. capacitor 110 is connected between the plate of the tube 68 and one terminal 112 of a switch. A rotor 114 of the switch is connected to the plates of the tube 106 and to a terminal 116 of a switch 118. A rotor 120 of the switch 118 is connected to the cathodes of the tube 106 through a 250K feed back adjustment potentiometer 122 and a 200 microampere meter 124. The cathodes of the tube 106 are also connected to a slider 126 of a 10K bias potentiometer 128, one end of the potentiometer 128 being grounded and the opposite end being connected to the B+ source through a 51K resistor 130. The slider 132 of the potentiometer 122 is connected to the junction of the resistors 54 and 56 through the series combination of 1 meg. resistors 134 and 136. The junction of the resistors 134 and 136 is bypassed to ground by way of a 0.1 mfd. capacitor 140.

With the switches 114 and 118 in the static feed back position, as shown in FIG. 5, a portion of the 6500 c.p.s. voltage developed at the plate of tube 68 of the A.C. power amplifier 12 is fed to the plates of the tube 106 of the feed back rectifier 18. The tube 106 rectifies this voltage and the resultant voltage appears across the potentiometer 122. By adjustment of the potentiometer 122, this voltage is applied as a bias voltage to the grids of the sections 46a and 46b of the tube 46, through a filter composed of the resistors 134 and 136, and the capacitors 138 and 140.

The amount of D.C. voltage developed across the potentiometer 122 is proportional to the A.C. voltage at the plate of the tube 68 of the A.C. power amplifier 12. Hence, an increase in signal amplitude produces an increase in oscillator bias voltage. The increased bias reduces the oscillator output by an amount sufficient to compensate for this condition. In this manner, the output of the power amplifier stage 12 is held essentially constant. Negative feed back is used to prevent small changes in output due to circuit fluctuations from appearing as defect indications, and to eliminate drift. The meter 124 indicates relative oscillator output and is useful for setting up the equipment. The potentiometer 128 provides a means by which the initial static oscillator bias may be adjusted.

The dynamic feed back amplifier 16, FIG. 5, employs two sections 142a, and 142b of a 12AX7 dual triode tube. The grid of section 142a is connected to the ungrounded end of the output transformer secondary winding 78, through the series combination of a 0.02 mfd. capacitor 144 and a 270K resistor 146. The junction of the capacitor 144 and the resistor 146 is grounded through a 470K resistor 148. The cathode of tube section 142a is grounded through a 0.1 mfd. capacitor 150 in parallel with a 2.2K resistor 152. The plate of the tube section 142a is connected to the B+ supply through a 100K resistor 154 connected in series with a 47K resistor 156. The junction of the resistors 154 and 156 is bypassed to ground by a 0.1 mfd. capacitor 158. The grid of the tube section 142b is connected to the plate of the tube section 142a through a series connected 270K resistor and a 0.02 mfd. capacitor 162. The junction of the resistor 160 and the capacitor 162 is grounded through a 270K resistor 164. The cathode of the tube section 142b is grounded. The plate of section 142b is connected to the B+ source through the series combination of one-half of a coupling transformer primary winding 168 and a 47K resistor 170. The junction of the winding 168 and the resistor 170 is bypassed to ground by a 0.1 mfd. capacitor 172. The transformer secondary winding 174 is connected to the remaining terminals of switches 114 and 118. The lower end of the winding 174 is connected to ground through a 0.01 mfd. capacitor 176.

When the switches 114 and 116 are in the dynamic feed back position, the feed back rectifier 18 is fed from the output of the dynamic feed back amplifier 16 with the result that a compensating action is produced similar to that previously described. This amplifier, however, receives its input from the secondary winding 78 of the output transformer. Because of this, the 6500 c.p.s. signal, and variations in it produced by defects in the rope, are fed to the dynamic feed back amplifier 16. The capacitor 176 provides a slight time lag in the response of the output of the feed back rectifier when this amplifier is in use. In this manner, the circuit is made insensitive to gradual changes in signal level, such as are produced by variations in rope diameter, cold work, and wear, by compensating for them. Abrupt changes in signal level caused by rope defects, however, are not cancelled out because of the delay mentioned above. Therefore, these defect indicating changes are registered.

The two sections 180a and 180b of a 12AX7 dual triode tube are utilized as a conventional two-stage amplifier (FIG. 6). The grid of the tube section 180a is connected to the ungrounded end of the output transformer secondary winding 78 through a 0.01 mfd. capacitor 182. The grid is grounded through a 1M resistor 184. The plate of the tube section 180a is connected to the B+ supply through series combination of a 100K resistor 186 and a 47K resistor 188. The junction of the resistors 186 and 188 is connected to ground through a 0.1 mfd. capacitor 190. The cathode of the tube section 180a is grounded through a 2700 ohm resistor 192. The grid of the tube section 180b is connected to the slider 194 of a 1M A.C. gain control potentiometer 196. One end of the potentiometer 196 is grounded. The opposite end is coupled to the plate of tube section 180a through a 0.001 capacitor 198. The plate of the tube section 180b is connected to the B+ supply through the series combination of a 100K resistor 200 and a 47K resistor 202. The junction of the resistors 200 and 202 is bypassed to ground through a 0.1 mfd. capacitor 204. The cathode of the tube section 180b is grounded through a 2700 ohm resistor 206. This constitutes a conventional two-stage class A A.C. amplifier which receives signal information from the inspection coil 20. Amplifier gain is determined by the setting of the potentiometer slider 194.

The two sections 106a and 106b of a 6CG7 triode tube constitute the individual class C amplifiers 32 and 36 (FIG. 6). The grids of both tube sections are tied together and are connected to the plate of the tube section 180b of the amplifier 26 through a 0.001 mfd. capacitor 206a. The grids are grounded through a 1M resistor 208. The plate of the tube section 106a is connected to the B+ supply through a 100K resistor 210 connected in series with a 47K resistor 212. The junction of the resistors 210 and 212 is bypassed to ground by a 0.1 mfd. capacitor 214. The plate of the tube section 106b is connected to the B+ supply through a 100K resistor 216 in series with a 47K resistor 218. The junction of the resistors 216 and 218 is also bypassed to ground by a 0.1 mfd. capacitor 220. The cathodes of tube sections 106a and 106b have a common connection to a slider 222 of a 50K ohm threshold adjustment potentiometer 224. The slider of the potentiometer is connected to ground through an 8 mfd. capacitor 226. One end of the potentiometer 224 is grounded and the opposite end is connected to the B+ source through a 50K resistor 228.

This amplifier has a common input and two equal, but separate, outputs. The tube sections 106a and 106b are supplied with the large bias voltage developed across the potentiometer 224. Because of the high bias level, this stage responds only to the positive tips of the input wave form. These tips represent the defect signal information when defects in the rope are sensed by the inspection coil 20.

The two sections 230a and 230b of a 6AL5 dual diode tube constitute the diode detectors 34 and 38 (FIG. 6). The cathode of the tube section 230a is connected to the plate of the tube section 106a through a 0.01 mfd. capacitor 232. The cathode is also connected to a slider 234 of a bias adjustment potentiometer 236 through a 470K resistor 238. The slider 234 is connected to ground through a 0.1 capacitor 240. One end of the potentiometer 236 is grounded and the opposite end is connected to the B+ supply through a 50K resistor 242. The cathode of the tube section 230b is connected to the plate of tube section 106b through a 0.01 mfd. capacitor 244, and to ground through a 470 K resistor 246. The plate of the tube section 230b is connected to ground through a filter network consisting of a 0.001 mfd. bypass and filter capacitor 248 in parallel with a 3.3M resistance 250, which is connected in series with a 240K resistor 252.

Each tube section 230a and 230b functions to rectify its incoming A.C. signal. Voltage output is negative and is proportional in amplitude to that of the input signal. The potentiometer 236 establishes the bias level of the D.C. amplifier stage which is driven by the output of the tube section 230a. The capacitor 248 filters the output of the tube section 230b. The resistances 250 and 252 form a voltage divider to reduce the input to the following stage of the system to the correct level.

The two sections 254a and 254b of a 6CG7 dual triode tube are employed in a bridge-type metering circuit constituting the vacuum tube voltmeter 28 (FIG. 6). The grid of the tube section 254a is connected to the junction of the resistors 250 and 252. This connection is through a 1M resistor 256. The grid is also bypassed to ground by a 0.0068 mfd. capacitor 258. The grid of the tube section 254b is grounded through the parallel combination of a 0.0068 mfd. capacitor 260 and a 1M resistor 262. The plates of the tube sections 254a and 254b are tied together and are connected to the B+ supply through a 47K resistor 264. The cathode of the tube section 254a is connected to one end of a 100-ohm meter zero-adjustment potentiometer 266 through the series connected resistors 268 and 270 of 300 and 3000 ohms, respectively. The junction of the resistors 268 and 270 is connected to the negative terminal of a 200 microampere meter 272. The cathode of the tube section 254b is connected to the opposite end of the potentiometer 266 through the series connected resistances 274 and 276, also of 300 and 3000 ohms, respectively. The resistance 276 is shunted by a 25K full-scale meter-adjust potentiometer 278. The junction of the resistors 274 and 276 is connected to the positive terminal of the meter 272, and to the slider 280 of the potentiometer 278. The slider 282 of potentiometer 266 is grounded.

The meter 272 is connected so as to indicate the difference in the cathode currents of the tube sections 254a and 254b. With no input to section 254a, the currents are essentially equal and the meter can be adjusted to zero by means of the potentiometer 266. A signal applied to the grid of section 254a will unbalance the bridge and cause a meter indication proportional to the amplitude of the signal. In this way, a relative measurement of defect intensity is obtained. The potentiometer 266 allows calibration of the metering circuit.

The D.C. amplifier 40 (FIG. 6) utilizes the paralleled two sections of a 6CG7 dual triode tube 284 to drive the recording pen-motor. The grids of the tube 284 are connected to the plate of the tube section 230a via a 1M resistor 286. The grids are also connected to ground through a 0.0068 mfd. capacitor 288. The plate of the tube section 230a is connected to ground through a filter network consisting of a 0.001 mfd. bypass and filter capacitor 290 in parallel with the series combination of a 5.1M resistor 292 and the capacitor 240. The cathodes of the tube 284 are grounded and the plates of the tube are connected to the B+ supply through a 2700 ohm resistor 294, a connector 296, a connecting cable 298, a connector 300, a pen-motor coil 302, a S.P.D.T. switch 304, a 1/32 amp. fuse 306 and a jumper 308. In addition, the series combination of the resistor 294, the coil 302 and the switch 304 is shunted by the series combination of a 270 ohm resistor 310 and an OB2 voltage regulator tube 312.

With a sound rope under test, the D.C. amplifier 40 is biased nearly to cut off by the negative voltage developed by the action of the tube section 230a. Under these conditions, a small current flows through the pen-motor coil 302 producing a small, uniform deflection of the recording pen. The presence of a defect in the rope will normally reduce the negative voltage developed by the tube section 230a. This reduces the bias applied to the tube 284 thereby causing it to conduct more heavily. This additional current produces a pen deflection which indicates the presence of the defect in the rope.

The resistor 310 and the tube 312 serve as an automatic current limiting circuit. The property of the tube 312 is that it possesses a high internal impedance when deionized, but a low impedance when in an ionized condition. Normally, the tube 312 is deionized making the tube effectively an open circuit. However, the circuit configuration is such that when a dangerously high current level is established through the pen-motor coil 302, the voltage drop across the coil and its series resistor 294 is sufficient to ionize the tube 312. When ionized, this tube provides a shunt pass for the current flow. The resistor 310 aids in equalizing the current flow through the two branches. A 1500-ohm resistor 314 is connected in place of the coil 302 by the switch 304 to provide a substitute load when the recorder is not in operation.

The dual power supply 42 and 44 consists of two identical electronically regulated supplies mounted on a common chassis. Because of the identity in the construction and operation of the systems, only one power supply section need be described herein. Reference may, therefore, be had to FIG. 7 which discloses both supplies.
Primary winding 316 of a power transformer 318 is connected to the 115-volt A.C. line through a connector 320. A two ampere fuse 322 and a switch 324 are connected in series with one primary lead. A secondary winding 326 of the transformer 318 supplies 6.3 volts for the heaters of the tubes 328 and 330. The secondary winding 332 and one-half of a secondary winding 334 are series connected to supply 6.25 volts to a connector 336 for transmission to the detector unit tube heaters. Two 47 ohm resistors 338 and 340 are connected in series across this combination. The junction of the resistors 338 and 340 is grounded.

A secondary winding 342 is center tapped and supplies 375 volts to each plate of the tube 328. The center tap of the secondary winding 342 is also grounded. The fuse 322 protects the power transformer from short circuits or overloads. The resistors 338 and 340 provide an electrical center tap for the 6.25 volt detector heater supply.

The 6X4 dual tube 328 serves as a full wave rectifier. The heater and plates of the tube 328 are supplied from the transformer 318, as previously described. The pulsating D.C. output is taken from the cathode of the tube 328. This circuit is conventional in all respects. A 6X4 tube is employed because its low internal impedance provides high rectification efficiency and superior regulatory characteristics.

The pulsating D.C. voltage taken from the rectifier tube 328 is fed through an internal jumper in a tube 344 to the positive terminal of an 8 mfd. capacitor 346. The negative terminal of the capacitor 346 is grounded. One end of a choke coil 348 is connected to the positive terminal of the capacitor 346. The other end of the coil is connected to the positive terminal of an 8 mfd. capacitor 350. The negative terminal of the capacitor 350 is also grounded. This circuit configuration constitutes a conventional so-called pie-section filter which serves to smooth the pulsing D.C. current from the rectifier tube 328. The output of the filter is practically a pure direct current.

With the tube 344 removed from its socket the power supply output voltage may rise to a higher than normal value. With the D.C. voltage connected through the internal jumper of the tube 344, no direct current can be present at the output of the power supply when the tube 344 is removed. This interlocking arrangement prevents the possibility of voltage overload and consequent damage to the detector unit.

The D.C. voltage from the positive terminal of the capacitor 350 is fed to the plate of the 6Y6 tube 330. The suppressor grid and plate of tube 330 are connected together so that this tube operates as a triode. The control grid of the tube 330 is directly connected to the plate of a 6SH7 tube 352. The D.C. output of this stage is taken from the cathode of the tube 330 and is fed to the connectors 336 for connection to the control unit. A 1.0 mfd. capacitor 354 bypasses the output to ground.

The tube 330 acts as a variable resistance in series with the D.C. output. The effective resistance of the tube is dependent upon the bias voltage applied to its grid. This bias voltage, in turn, is a function of the regulator control stage.

The regulator tube 344 is an 0A3 tube which has its cathode grounded and its anode connected to the cathode of the tube 330. The construction of the tube 344 is such that a constant potential of approximately 75 volts appears across it. This voltage is fed to the cathode of the tube 352 where it serves as a reference potential for the regulator control stage.

The 6SH7 pentode tube 352 is the regulator control. The plate of the tube 352 is connected to the D.C. output voltage through a 510K resistor 356. The plate is also connected to the control grid of the tube 330. A series string composed of a 27K resistor 358, a 62K resistor 360, a 25K voltage adjusting potentiometer 362 and a 27K resistor 364 is connected between the D.C. output voltage (B+) and ground. The screen of the tube 352 is connected to the junction of the resistors 358 and 360. The control grid is connected to the slider of the voltage adjusting potentiometer 362 through a 220K resistor 366. A 0.25 mfd. capacitor 368 is connected between the control grid of the tube 352 and the B+ voltage supply. The suppressor grid of the tube 352 is connected to its cathode, and the cathode is connected to the B+ voltage supply through a 47K resistor 369 and to the anode of tube 344.

The tube 352 is connected as a D.C. amplifier with its output directly coupled to the grid of the tube 330. The grid of the tube 330 receives a portion of the B+ voltage as determined by the position of the slider of the voltage adjustment potentiometer 362. Adjustment of the potentiometer 362 allows the D.C. output voltage to be varied over a limited range. The tube 344 holds the voltage at the cathode of the tube 352 constant. Therefore, any change in the B+ voltage will be reflected by the tube 352 as a change in its grid bias. These changes are amplified by the tube and are fed to the grid of the tube 330 thereby controlling its bias and hence its conductance.

The capacitor 368 provides a low impedance path to the grid of the tube 352 for ripple voltages, thereby improving the reaction of the regulator to these voltages.

The recorder 370 (FIGS. 1 and 2) is a modified Easterline-Angus Chart Recorder which provides the chassis and the chart drive gears and rolls 376. The drive motor of the Easterline-Angus recorder has been removed and a Ford Instrument Company Telesyn 382 (FIG. 2) has been substituted. The Telesyn includes a synchronous motor by which the chart mechanism is driven. The motor of the selsyn 382 is mechanically coupled to the chart drive gears and rolls 376. It is, of course, desirable that the recorder chart be driven at a rate proportional to the rate at which the wire rope being inspected passes through the inspection coil 20. To this end a dynamometer frame 386 is mounted on the rope. This frame is in the form of a spider having legs 418, 420 and 422. The free end of each of the legs provides a mounting for rotary sheaves 424, 426 and 428, respectively, which are adapted to engage the moving rope as it is being inspected. Connected through a gear train to the shaft of the sheave 426 is a selsyn 430 which may also be a Ford Instrument Company Telesyn. As the shaft 432 of the sheave 426 rotates, the rotation is mechanically transmitted to the selsyn 430 which produces an output signal that is proportional to the speed at which the rope is travelling. The output signal from the selsyn 430 is transmitted to the selsyn 382 which is mechanically coupled to the chart drive gears and rolls 376, as previously stated.

Figure 2:
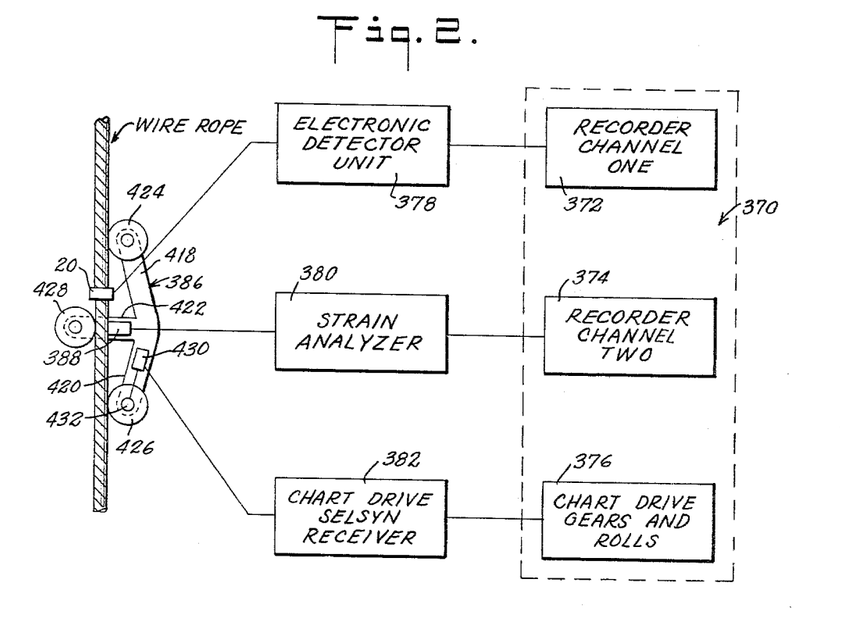
FIG. 2 is a diagram partially in block form showing the electronic detector unit of the invention connected into a system including also a rope strain analyzer and a record chart driving system.

The inspection coil 20 may be supported about the rope in any suitable manner, as by mounting it on the leg 418 of the dynamometer spider. As shown in FIGS. 2 and 5, the coil 20 is electrically connected to the electronic detector unit, above described, and which is indicated as a whole in FIG. 2 by the reference numeral 378. The output signal of the electronic detector unit 378 is coupled into the first recorder channel 372. A Brush Development Company Magnetic Penmotor model BL-902A in the recorder channel receives the output of the electronic detector unit 378 and controls the marking stylus.

Because of the fact that variations in rope strains can produce indications similar to those caused by actual rope defects, it is desirable to indicate the presence and magnitude of such strains at the time the rope is being inspected. In order to provide a record of rope strain in parallel with the rope defect record, a strain gauge 388 (FIG. 2), such as a Baldwin-Lime-Hamilton SR-4, Type A-5-1, may be mounted on the third leg 422 of the dynamometer spider. As shown in the art, the deflection sheave 428 of the spider structure can be adjusted inwardly toward the rope such that the rope is slightly deflected in an inward direction as it passes over the sheaves 424 and 426. Variations in the strain on the rope will result in output signals from the strain gauge which are fed into a strain analyzer 380. A Brush Development Company universal amplifier, model BL-520, is a suitable circuit for the purpose. The output signal of the strain analyzer 380 is fed into the second recorder channel 374 which also consists of a Brush Magnetic Penmotor model BL-902A. In this manner, changes in rope strain are simultaneously registered on the chart paper adjacent the record of the rope condition. Should a sudden strain deviation cause the electronic detector unit 378 to register on recorder channel 372 as if a defect were present, this condition will be shown by a deflection of the pen in the second recorder channel 374. The addition of the strain analyzing system and the second recorder channel are particularly useful when inspecting hoist ropes, etc., where rapid acceleration or sudden stops, which affect rope strains, are commonly encountered. In the applications where strain on the rope is reasonably constant, use of the strain analyzing system and the second recorder channel can be eliminated.

Strain analyzing systems and systems for driving recording charts at a rate proportional to the rate of movement of a body being tested are well known to those skilled in the art, and any such systems can be embodied in the rope inspecting arrangement herein. Since none of the details of these systems are novel, the foregoing general description is deemed sufficient for the purpose of this application.

The chart drive gears and rolls, by resort to suitable switches, can be made to drive the record chart in any one of three modes: (1) at a manually variable speed; (2) at a speed directly proportional to that of the rope passing through the inspection coil 20; and (3) at a synchronous fixed unidirectional speed.

In the first mode, the motor drive may be operated in either the forward or reverse direction, in the second mode, the motor drive will operate in the direction in which the rope is travelling. In all modes, the chart paper take-up and feed rolls are spring-loaded for operation with nearly uniform chart tension.

The first operational mode is used for setting up the unit preparatory to a rope inspecting operation. This mode is also conveniently used when examining the chart paper at the completion of an inspection. In this mode, the selsyn receiver 382 is operated as a polyphase A.C. motor fed by a variable voltage transformer. The second mode is employed while the test is in progress. In this mode, the movement of the chart paper is proportional to the rate at which the rope travels through the inspection coil. Therefore, any defect charted during the inspecting operation can be located later on the rope from its position on the chart. In this mode, the selsyn receiver 382 is fed by the selsyn transmitter 430 coupled to the hoist. The third mode of operation is employed for testing when a selsyn transmitter is not used.

Figure 3:
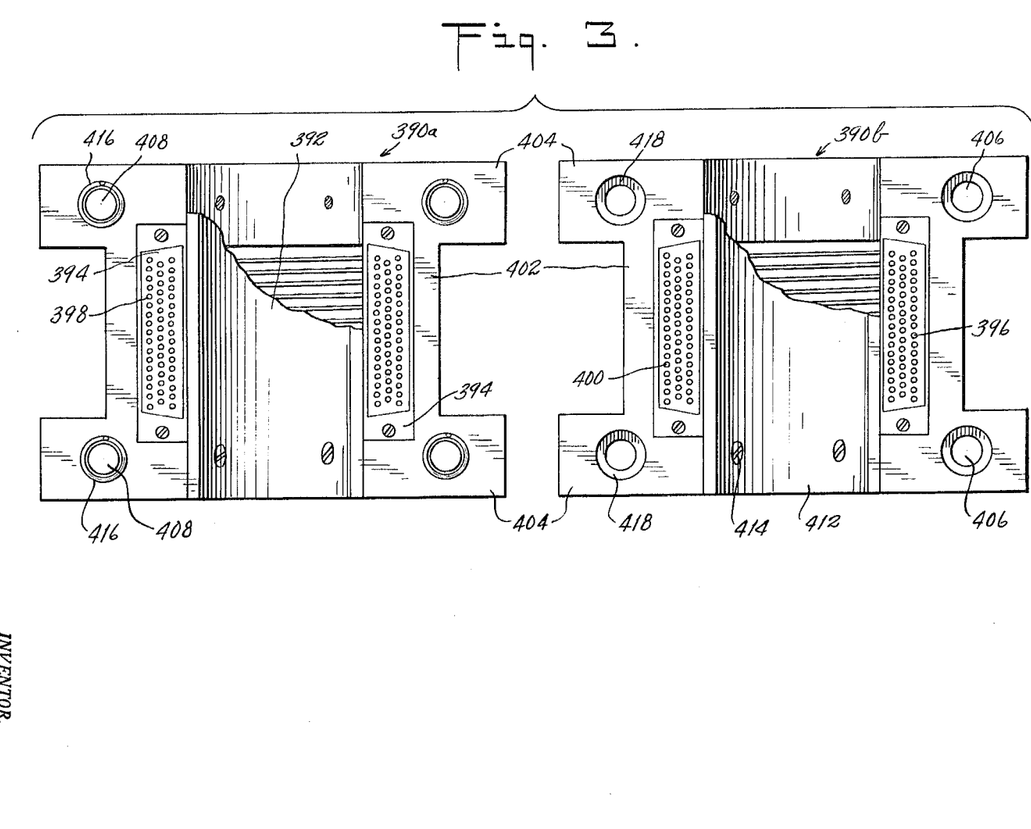
FIG. 3 illustrates the two halves of a separable rope inspection coil.
Figure 4:
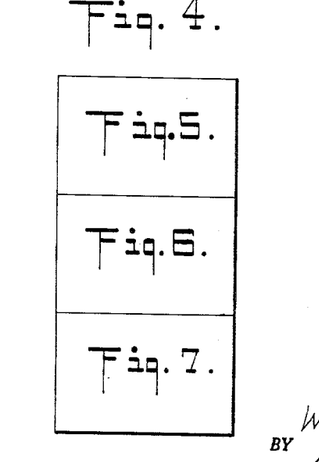
FIG. 4 indicates the arrangement of FIGS. 5, 6 and 7 for continuity of the circuit diagrams therein.

The coil 20 which surrounds the rope under test may be of any suitable form so long that it sufficiently embraces the rope such that the rope as it passes through the coil sets up a flux field. FIG. 3 of the drawings illustrates a two-piece coil assembly which is particularly well adapted for use in the inspection system. The need for an articulated coil structure is apparent when the characteristics of commonly used coil structures are examined in light of the intended use of the inspection system.

The installation of a pre-constructed coil of continuous toroidal configuration requires that the rope to be tested be free at one end to receive the coil. Since this is seldom the case in service, the rope must be dismantled from its load, the coil is then slipped into place over the rope, and the connection between the rope and its load must then be re-established before testing can begin. In many instances, this may be a highly complex and time-consuming task. Moreover, the same procedure must be followed to remove the coil if it is to be reused at another location.

Coils of toroidal form may, of course, be wound in situ about the rope. In this case, however, the process is time consuming, and the rope in general, cannot be used until the winding of the coil is completed. Furthermore, the coils wound in this manner are apt to differ widely in their electrical characteristics, which factor may lead to testing difficulties and inaccurate indications.

Furthermore, should the rope under test contain bulges, snags, etc., these irregularities, when passing through conventional coils, may catch the coil and cause damage thereto. They may also tear the coils from their mounting thus damaging leads and associated equipment. The coil herein, which is well suited to its task, is of a two-piece construction and avoids the foregoing difficulties. Basically, it consists of a 50-turn coil split longitudinally and supported in a pair of separable non-metallic housings.

FIG. 3 shows the two halves 390a and 390b. Each section of the coil consist of 50-half-turn three layer windings 392 of No. 18 enamel-coated copper wire, as previously stated. The half-turn windings terminate in connectors 394 and 396. The connectors 394 of the half-coil 390a have forwardly projecting pins 398 to opposite pairs of which each half-turn of coil wire is connected. The connectors 396 of the half-coil 390b present sockets 400 which correspond in number and location to the pins 398 of the connectors 394 of the half-coil 390a. The opposite ends of each half-turn of the coil in the half-coil 390b are connected to oppositely disposed pairs of sockets 400. Thus, when the pins 398 of the connectors 394 are inserted into the sockets 400 of the connectors 396, electrical continuity is established in the turns of the coil. Each of the half-coils is supported in a body shell 402 which is capped at opposite ends by coil flanges 404. The flat face of the coil flanges 404 associated with the half-coil 390b is provided with holes 406 adapted to receive correspondingly located pins 408 projecting from the flat faces of the coil flanges associated with the half-coil 390a. The diameter of the holes 406 and that of the pins 408 is respectively such that the pins 408 fit snugly into the holes 406 and thereby frictionally hold the two halves together. Inter-engagement of the pins 398 with the sockets 400 also contributes to this effect.

The half-coil 390 includes an outwardly extending fitting (not shown) which is supported on its body shell 402 and to which the coil is electrically connected. The fitting is adapted to accommodate the cable 104 (FIG. 5) for electrically connecting the coil into the detector unit. Each half-coil has a coil liner 412 fixed to the throat thereof by a plurality of screws 414 which pass through opposite ends of the liner and into the coil flanges. This liner protects the turns of the coil against possible damage by the rope as it passes through the coil sections assembled thereabout during a test operation. The coil body 402, the coil flanges 404 and the coil liners 412 are constructed of non-metallic material such as Bakelite, for example.

In certain applications, the coil is held about a rope in rope testing position by means of a fixture from which the coil may be automatically ejected by the rope and removed from the rope in case the rope contains a bulge, or a snag, or the like, which will not pass through the coil. In order that the half coils may automatically separate from each other during such ejecting movement, the pins 408 support compression springs 416 which are adapted to seat on shoulders 418 formed in the holes 406 of the opposite half coil. When these springs are employed and placed under compression upon assembly of the two half coils about a rope to be tested, they will exert sufficient force to separate the half coils when a rope bulge dislodges the coil from its frictional holding seat.

The coil assembly, as described, has a D.C. resistance of 0.4 ohm and an inductance of 260 microhenries. This coil has been found suitable for testing ropes with diameters in the range of ½ to 1½ inches. Coil assemblies utilizing the same principles of construction may be easily formed to accommodate other rope sizes.

The coil assembly, by reason of its two-piece construction, may be quickly installed on any rope in use merely by clamping the two halves together over the rope. The coil is easily removed by reversing the procedure. In most instances, the rope service interruption is, at the most, a few seconds.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. A wire rope inspection system comprising an inspection inductor coil adapted to encircle a wire rope for structural inspection thereof during relative longitudinal movement of the rope therethrough, said coil forming part of a resonant circuit, oscillator means, coupling means for applying output signals from said oscillator means to said inductor coil to energize said inductor coil with alternating current of at least high audio frequency to produce an alternating electromagnetic inspection field in a longitudinal length of said rope, dynamic feedback means including time delay means for applying to said oscillator means signals from said coupling means representative of signals at said inductor coil to vary said output signals from said oscillator means so that said signals from said coupling means do not change appreciably because of gradual changes in the inductance of said inductor coil caused by changes in the electromagnetic characteristics of the rope under inspection, said dynamic feedback means operating so that relatively abrupt changes in said inductance caused by changes in the electromagnetic characteristics of the rope under inspection do not cause said output signals from said oscillator means to vary appreciably and, because of said abrupt changes in inductance, corresponding appreciable changes in said signals from said coupling means are accordingly produced, and sensing means for sensing said signals from said coupling means.

2. A wire rope inspection system comprising an inspection inductor coil adapted to encircle a wire rope for structural inspection thereof during relative longitudinal movement of the rope therethrough, said coil forming part of a resonant circuit, amplifier means, output circuit means, oscillator means coupled by the amplifier means and the output circuit means to said inductor coil for energizing said inductor coil with alternating current of at least high audio frequency to produce an alternating electromagnetic inspection field in a longitudinal length of said rope, dynamic feedback amplifier means including time delay means for applying to said oscillator means signals from said output circuit means to stabilize said oscillator means so that output signals from said output circuit means do not change appreciably because of gradual changes in the inductance of said inductor coil caused by changes in the electromagnetic characteristics of the rope under inspection, said dynamic feedback amplifier means operating so that relatively abrupt changes in said inductance caused by changes in the electromagnetic characteristics of the rope under inspection produce corresponding appreciable changes in said output signals, and sensing means for sensing said output signals.

3. A wire rope inspection system as recited in claim 2, wherein said output circuit means includes at least one capacitor for providing capacitance which together with the inductance of said inspection inductor coil forms said resonant circuit.

4. A wire rope inspection system as recited in claim 3, wherein said output circuit means further includes an attenuator, said at least one capacitor and said attenuator being connected in series to couple said amplifier means to said inspection inductor coil, and said output signals from said output circuit means are taken from the junction of said at least one capacitor and said attenuator.

5. A wire rope inspection system as recited in claim 2, including means responsive to the tension of said rope under inspection for generating signals representative of said tension.

6. A wire rope inspection system as recited in claim 2, wherein said sensing means includes indicating means for providing a representation of said output signals.

7. A wire rope inspection system as recited in claim 2, wherein said sensing means includes means for recording said output signals.

8. A wire rope inspection system as recited in claim 2, including static feedback means for applying to said oscillator means signals from said amplifier means to stabilize said oscillator means so that said output signals from said output circuit means do not change appreciably because of circuit fluctuations, and switching means for selectively coupling one of said dynamic feedback amplifier means and said static feedback means to said oscillator means to provide feedback signals from one of said dynamic feedback amplifier means and said static feedback means to said oscillator means.

References Cited by the Examiner

UNITED STATES PATENTS

| | | | |
|---|---|---|---|
| 890,085 | 6/1908 | McCann et al. | 324—37 |
| 1,823,810 | 9/1931 | Wall | 324—37 |
| 2,374,652 | 5/1945 | Cohen | 324—37 |
| 2,889,513 | 6/1959 | Callan | 324—37 |
| 2,928,043 | 3/1960 | Foerster | 324—40 |
| 3,159,784 | 12/1964 | Haslett | 324—40 |

FREDERICK M. STRADER, *Primary Examiner.*

WALTER L. CARLSON, *Examiner.*